(12) United States Patent
Arsenault et al.

(10) Patent No.: US 7,903,266 B2
(45) Date of Patent: Mar. 8, 2011

(54) SYSTEM AND METHOD FOR USING DIVIDED FONTS TO ACHIEVE PROPORTIONAL SPACING

(75) Inventors: Robert G. Arsenault, Stratford, CT (US); Beth A. Jennings, Shelton, CT (US); Craig J. DeFillippo, Milford, CT (US); Sandra J. Peterson, Norwalk, CT (US); Christopher D. Smith, New Milford, CT (US); William F. Bailey, Guilford, CT (US); John A. Hurd, Torrington, CT (US); Wesley A. Kirschner, Farmington, CT (US); Michael R. Davis, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 1272 days.

(21) Appl. No.: 11/430,498

(22) Filed: May 8, 2006

(65) Prior Publication Data
US 2007/0257919 A1    Nov. 8, 2007

(51) Int. Cl.
*G06K 15/02* (2006.01)
*G06F 15/00* (2006.01)
(52) U.S. Cl. .......................... 358/1.11; 358/1.2; 345/467
(58) Field of Classification Search .................. 358/1.1, 358/1.2, 1.9, 1.11, 1.18, 1.15, 1.13, 1.16; 715/243, 244, 245, 246, 247, 250, 269, 270, 715/274; 345/471, 467, 468, 469, 469.1, 345/470, 472, 472.1, 472.2
See application file for complete search history.

(56) References Cited

U.S. PATENT DOCUMENTS

| 5,251,293 A * | 10/1993 | Ishii et al. ................... 715/210 |
| 6,583,789 B1 | 6/2003 | Carlson et al. |
| 2006/0069992 A1* | 3/2006 | Hodder ........................ 715/535 |

FOREIGN PATENT DOCUMENTS

| WO | 2006013582 A3 | 2/2006 |
| WO | WO2006/013582 A3 | 2/2006 |

OTHER PUBLICATIONS

EPO Search Report in EP07009234, dated Apr. 23, 2010.
European Search Report, dated Aug. 26, 2010 for EP Application No. 07009234.1.

* cited by examiner

*Primary Examiner* — Dov Popovici
(74) *Attorney, Agent, or Firm* — George M. Macdonald; Charles M. Malandra, Jr.

(57) ABSTRACT

A method of printing a string of characters includes receiving a sequence of character data codes. Each character data code corresponds to a respective character to be printed in the string of characters. The method also includes transcoding the sequence of character data codes to generate a sequence of glyph codes. Each glyph code corresponds to a respective glyph. Each glyph corresponds to at least part of a respective character. At least some of the glyphs correspond to less than a complete character. The method further includes using the sequence of glyph codes to generate print image data and printing an image on the basis of the print image data.

16 Claims, 5 Drawing Sheets

0123456789.EUR

FIG. 1
(PRIOR ART)

12.89 EUR
FIG. 2
(PRIOR ART)

12.89 EUR
FIG. 4

0123456789.EUR

FIG. 3

SYSTEM AND METHOD FOR USING DIVIDED FONTS TO ACHIEVE PROPORTIONAL SPACING

BACKGROUND

This invention relates generally to printing of character strings, and may be applied to printing of postage indicia by postage meters.

Conventional postage meters use conventional printing technology such as thermal printing or inkjet printing to print postage indicia on mailpieces or on labels to be applied to mailpieces. Typically, some portions of the indicia are "fixed"—i.e., do not vary from indicium to indicium printed by the same meter, whereas other portions of the indicia are "variable"—i.e., do vary from indicium to indicium printed by the same meter. An example of a variable portion of conventional postage indicia is the character string which indicates the amount of postage represented by the indicia.

In conventional postage meters, variable character strings are printed using "fixed spacing", which is a manner of spacing the character string such that each character occupies exactly the same amount of space along the printed line. Fixed spacing was typically produced by conventional typewriters, but, in word processing equipment or software, proportional spacing is often employed, such that the amount of space occupied in the line of print may vary from character to character. For example, in proportional spacing, the letter "w" may occupy more space along the print line than the letter "i".

FIG. 1 is an illustration of a conventional postage meter font used for printing with fixed spacing. It will be observed that each character, including the space character (" ") and the decimal point, is defined in a respective print cell, and that all of the print cells are the same size. FIG. 2 is an example of a postage-amount character string printed with the font shown in FIG. 1. As would be expected from the description of the font shown in FIG. 1, the decimal point and the space character each occupy the same amount of space in the character string shown in FIG. 2 as is occupied by each of the other characters.

In the interest of improving the appearance of the postage-amount string shown in FIG. 2, it may be desirable, or even required by postal authorities, to decrease the amount of space along the print line occupied by the decimal point and the space character, as would be done if proportional spacing were employed. However, conventional postage meter printing software cannot be converted to conventional proportional spacing fonts without significant and expensive software redesign.

SUMMARY

A method of printing a string of characters includes receiving a sequence of character data codes. Each character data code corresponds to a respective character to be printed in the string of characters. The method also includes transcoding the sequence of character data codes to generate a sequence of glyph codes. Each glyph code corresponds to a respective glyph. Each glyph corresponds to at least part of a respective character. At least some of the glyphs each correspond to less than a complete character. The method further includes using the sequence of glyph codes to generate print image data, and printing an image on the basis of the print image data.

As used herein and in the appended claims, and in accordance with a conventional meaning of the term, the word "glyph" refers to an image used in the visual representation of a character or characters. As will be apparent from the above-described example of a conventional font, the word "character" includes alphanumeric characters as well as the character which represents a space between two characters, and a decimal point. The word "character" should also be understood to refer to punctuation and other printing marks, and characters from alphabets and systems of symbology other than the Roman alphabet.

The transcoding step may include causing, with respect to at least one of the character data codes, at least two respective glyph codes to be incorporated in the sequence of glyph codes. The transcoding step may further include, for each character data code of a first class of character data codes, inserting only two glyph codes in the sequence of glyph codes. In addition, the transcoding step may include, for each character data code of a second class of character data codes, inserting only one glyph code in the sequence of glyph codes.

For each character data code of the second class of character data codes, the inserted one glyph may be identical to the character data code in question. For each character data code of the first class of character data codes, the inserted two glyph codes may consist of (a) a first glyph code that is identical to the character data code in question, and (b) a second glyph code that is different from the first glyph code.

The second glyph code may have two least significant hexadecimal digits that are identical to two least significant hexadecimal digits of the first glyph code and two most significant hexadecimal digits that are different from two most significant hexadecimal digits of the first glyph code.

The step of using the sequence of glyph codes to generate print image data may include accessing respective glyph bit maps that correspond to the glyph codes in the sequence of glyph codes. Each glyph may be sized to fit in a standard print cell, and some of the characters may occupy only one of the standard print cells, while other characters may occupy two adjoining ones of the standard print cells. The printed image may be a postage meter and a font used in the printing may be such that none of the characters occupies more than two of the standard print cells.

In another aspect, a method of storing and retrieving character image bit maps includes, for each character of a group of half-size characters, storing a respective complete bit map. For each character of a group of full-size characters, the method includes storing a respective pair of split bit maps. The method includes printing a one of the full-size characters by retrieving a first one of the split bit maps in response to a first glyph code, and retrieving a second one of the split bit maps in response to a second glyph code that is different from the first glyph code. The printing step also includes printing the first and second ones of the split bit maps in a first and a second print cell, respectively. The first and second print cells are adjacent to each other.

Further in accordance with this aspect, the group of half-size characters includes a space character and a decimal point character. The group of full-size characters may include a plurality of single-digit numerals, including the conventional ten Arabic single-digit numerals.

In still another aspect, a printing apparatus includes a print head and a control mechanism. The control mechanism is coupled to the print head and is provided to control the print head to selectively print half-size characters and full-size characters. The control mechanism is operative to cause the print head to print each half-size character in a character string in a respective print cell and to print each full-size character in the character string in a respective pair of adjacent print cells.

All of the print cells may be equal in size to each other. The print head and the control mechanism may be included in a postage meter. The control mechanism may include a mechanism for storing a respective complete bit map for each half-size character, and a mechanism for storing a respective pair of split bit maps for each full-size character.

In yet another aspect, a printing method includes storing data representing only one glyph with respect to each character of a first group of characters. The only one glyph corresponds to the character in question. The printing method also includes storing data representing two or more glyphs with respect to each character of a second group of characters. The two or more glyphs correspond to the character in question of the second group. The printing method further includes printing a selected character of the first group by printing the only one glyph which corresponds to the selected character of the first group. In addition, the printing method includes printing a selected character of the second group by printing the two or more glyphs which correspond to the selected character of the second group.

Each of the glyphs may be represented in the stored data by a respective bit map. Each of the bit maps may be equivalent in size to each other of the bit maps.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 1 shows a conventional postage meter printing font.

FIG. 2 shows an example postage-amount character string printed with the font of FIG. 1.

FIG. 3 shows an example postage meter printing font provided in accordance with an embodiment of the invention.

FIG. 4 shows an example postage-amount character string printed with the font of FIG. 3.

DETAILED DESCRIPTION

The present invention, in its various aspects, allows for printing of character strings in a manner that simulates proportional spacing within a software framework that calls for fixed-space printing. All printing of characters is performed in fixed-size printing cells, but, in some embodiments, wider characters are divided into two or more glyphs and each glyph is printed in a respective printing cell. Consequently, wider characters are printed in two or more printing cells, whereas narrower characters are represented by only one glyph and are printed in only one printing cell.

FIG. 3 shows an example postage meter printing font provided in accordance with an embodiment of the invention. It will be noted that the font shown in FIG. 3 includes the Arabic single-digit numerals "0" through "9" as well as the letters "E", "U" and "R". Each of these characters is divided vertically down the center to produce for each character two respective glyphs. In each case the two glyphs represent the left and right sides, respectively, of the character and may be printed side by side in respective print cells to produce the complete character. The print cells may each be half the size of the print cells employed for the conventional font shown in FIG. 1. Thus each of the alphanumeric characters shown in FIG. 3 may occupy two adjacent printing cells of the reduced (half) size utilized for the font shown in FIG. 3.

The font shown in FIG. 3 also includes characters which represent the decimal point and a blank space. Each of the latter two characters is represented by only a single glyph rather than the two glyphs used for each of the other characters. (It will be understood that in the case of the blank space character, its respective glyph is a "null" glyph.) Accordingly, the decimal point and the blank space may each be printed in only one of the printing cells utilized for the font shown in FIG. 3.

The font shown in FIG. 3 may be suitable for printing the postage-amount character string to be included in a postage meter indicium in a country in the "euro zone". That is, the font shown in FIG. 3 may be suitable for printing a character string that indicates a postage amount denominated in euros. FIG. 4 shows an example of a postage-amount character string printed with the font shown in FIG. 3. If the character string shown in FIG. 4 is compared with the character string shown in FIG. 2, it will be observed that the character string shown in FIG. 4 simulates proportional spacing, by using the half-size standard printing cell for the font of FIG. 3, and printing the numerals and letters with two such printing cells and the decimal point and blank space with one printing cell apiece. The character string shown in FIG. 4 may be considered to be more aesthetically pleasing than the character string shown in FIG. 2.

Figure 5:
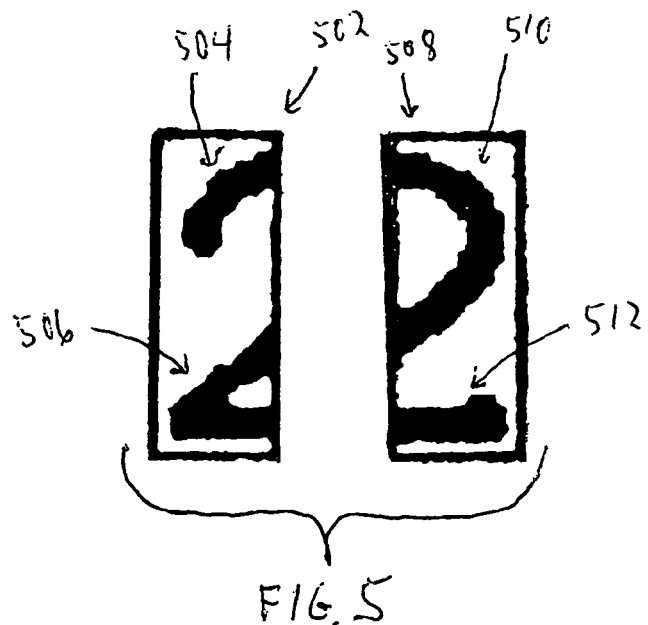
FIG. 5 shows on an enlarged scale two glyph bit maps that make up one of the characters of the font of FIG. 3.

FIG. 5 shows on an enlarged scale two glyph bit maps that make up the numeral "2" from the font of FIG. 3. More specifically, the numeral "2" is represented by a left-side glyph 502, which in turn is composed of two sub-glyphs (disconnected glyph-portions) 504 and 506. The numeral "2" is completed by the right-side glyph 508, composed in turn of two sub-glyphs 510 and 512. It will be noted that each of the glyphs 502, 508 is sized to fit exactly in the standard half-size print cell utilized for the font shown in FIG. 3. As discussed below, each of the glyphs 502, 508 (and the other glyphs shown in FIG. 3) may be stored as a respective bit map in a font memory. (For purposes of illustration, FIG. 5 includes outlines to define the print cells to which the glyph bit maps are fitted. However, in practice it will be understood that only the numeral halves, and not the outlines, are included in the glyphs and their respective bit maps.) Each of the glyph bit maps shown in FIG. 5 may be considered to be a "split bit map" in the sense that it is obtained by splitting a character. From FIG. 3 it will be appreciated that each of the other alphanumeric characters in the font is also represented by a respective pair of split bit maps. The half-size print cell used for the font of FIG. 3 may be considered a "standard print cell" in the sense that only one size of print cell is used and every glyph that makes up the font fits exactly in the half-size print cell. It follows that all of the glyph bit maps are equal in size to each other.

Figure 6:
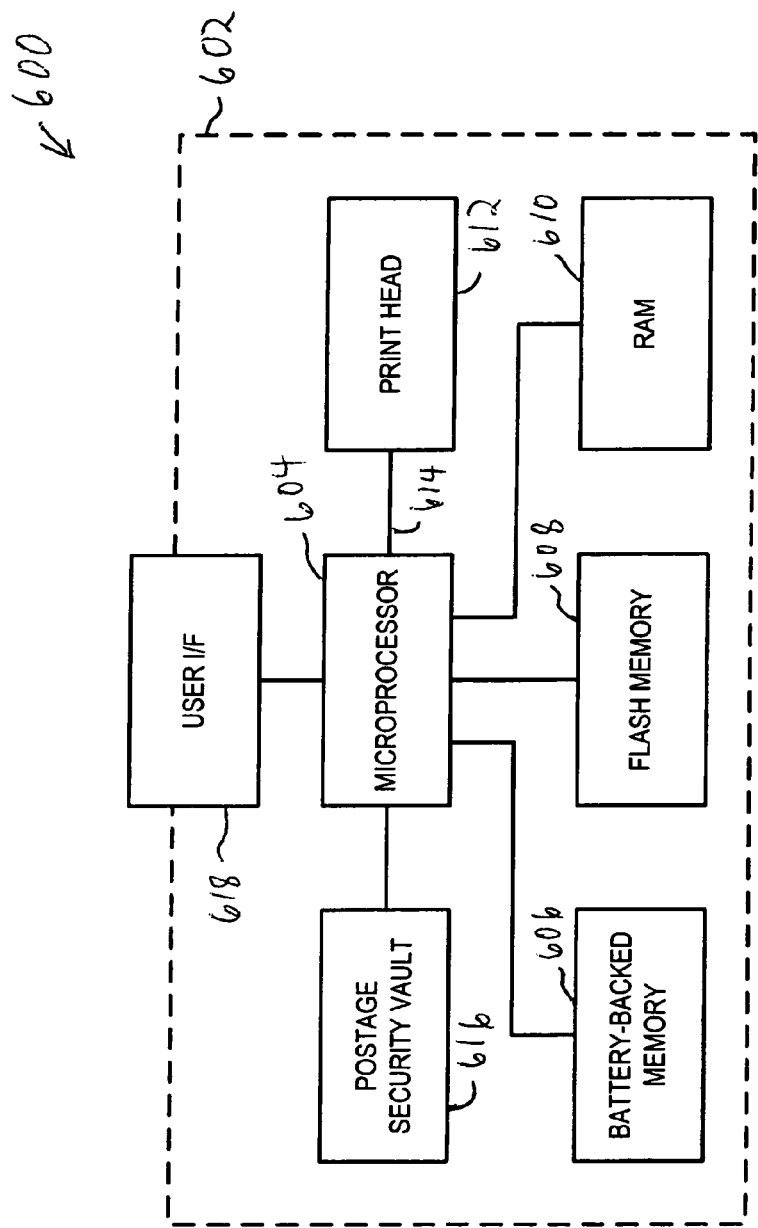
FIG. 6 is a block diagram illustration of a postage meter in which the present invention may be embodied.

FIG. 6 is a simplified block diagram illustration of a postage meter 600 in which the present invention may be embodied. In its hardware aspects, the postage meter 600 may be substantially or entirely conventional, with one or more aspects of the present invention being implemented with font data stored, and printing software installed, in accordance with the invention.

In any case, the postage meter 600 may include a housing (schematically indicated at 602). The housing 602 may be of molded plastic or other conventional construction. The postage meter 600 may also include a conventional microprocessor 604 (or alternatively a microcontroller or the like) which operates under control of a stored software/firmware program to generally control operation of the postage meter 600.

The postage meter 600 may further include one or more memory devices in communication with the microprocessor 604. For example, the memory devices may include a battery-backed memory (e.g. a CMOS memory) 606, a flash memory 608 and a RAM (random access memory) 610. The CMOS memory 606, if present, may store information such as a bit map that represents fixed elements of the postage indicia to be printed by the postage meter 600. The flash memory 608, if present, may serve as a font memory (i.e., glyph memory) to store the glyphs which make up, for example, the font shown in FIG. 3. The flash memory may also, or alternatively, serve as program memory to store the software program which controls the microprocessor 604 and hence controls operation of the postage meter 600.

The RAM 610, if present, may serve as working memory. For example, the RAM 610 may from time to time store bit maps which represent specific instances of the postage indicia to be printed by the postage meter 600. The specific postage indicia bit maps may be assembled by the microprocessor from component bit map elements retrieved as appropriate from the memories 606, 608. In addition or alternatively, the specific postage indicia bit maps may include one or more elements (e.g., a two-dimensional barcode) that may be generated by the microprocessor 604 in accordance with relevant software instructions.

The postage meter 600 also includes a print head 612. The print head 612 is coupled by a signal path 614 to the microprocessor 604 to allow the microprocessor 604 to control operation of the print head 612. Under the control of the microprocessor 604, the print head 612 is operative to print postage indicia. The postage indicia may include one or more character strings (e.g., an indication of the postage amount represented by the indicia) using the font shown in FIG. 3, for example.

In accordance with conventional practices, the postage meter 600 further includes a postage security vault 616 which is coupled to the microprocessor 604 and which provides security for postage funds stored in the postage meter 600.

The postage meter 600 may also include a conventional user interface 618, which comprises input/output devices (not separately shown) which allow a user of the postage meter 600 to interact with the postage meter via the microprocessor 604.

Figure 7:
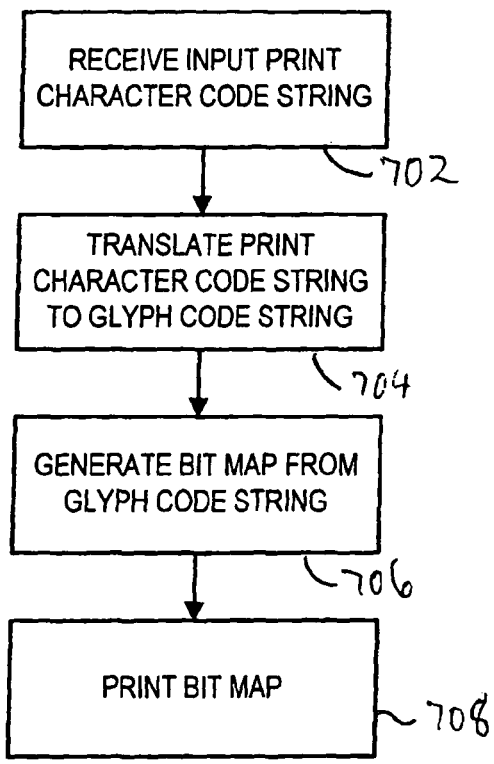
FIG. 7 is a flow chart that illustrates a printing method performed in accordance with an embodiment of the invention.

FIG. 7 is a flow chart that illustrates a printing method that may be performed in the postage meter 600 in accordance with an embodiment of the invention.

At 702 in FIG. 7, an input character code string is received. The input character code string may represent a postage amount or other variable information to be included in a postage indicium to be printed by the postage meter. The input character code string may, for example, be received by a print software module from another software module that operates within the postage meter. The input character code string may consist of a sequence of character codes, where each character code in the string represents a respective character to be included in the character string to be included in the postage indicium. For example, the character codes in the input character code strings may be ASCII codes or may be from another conventional mode for representing character strings.

Figure 8:
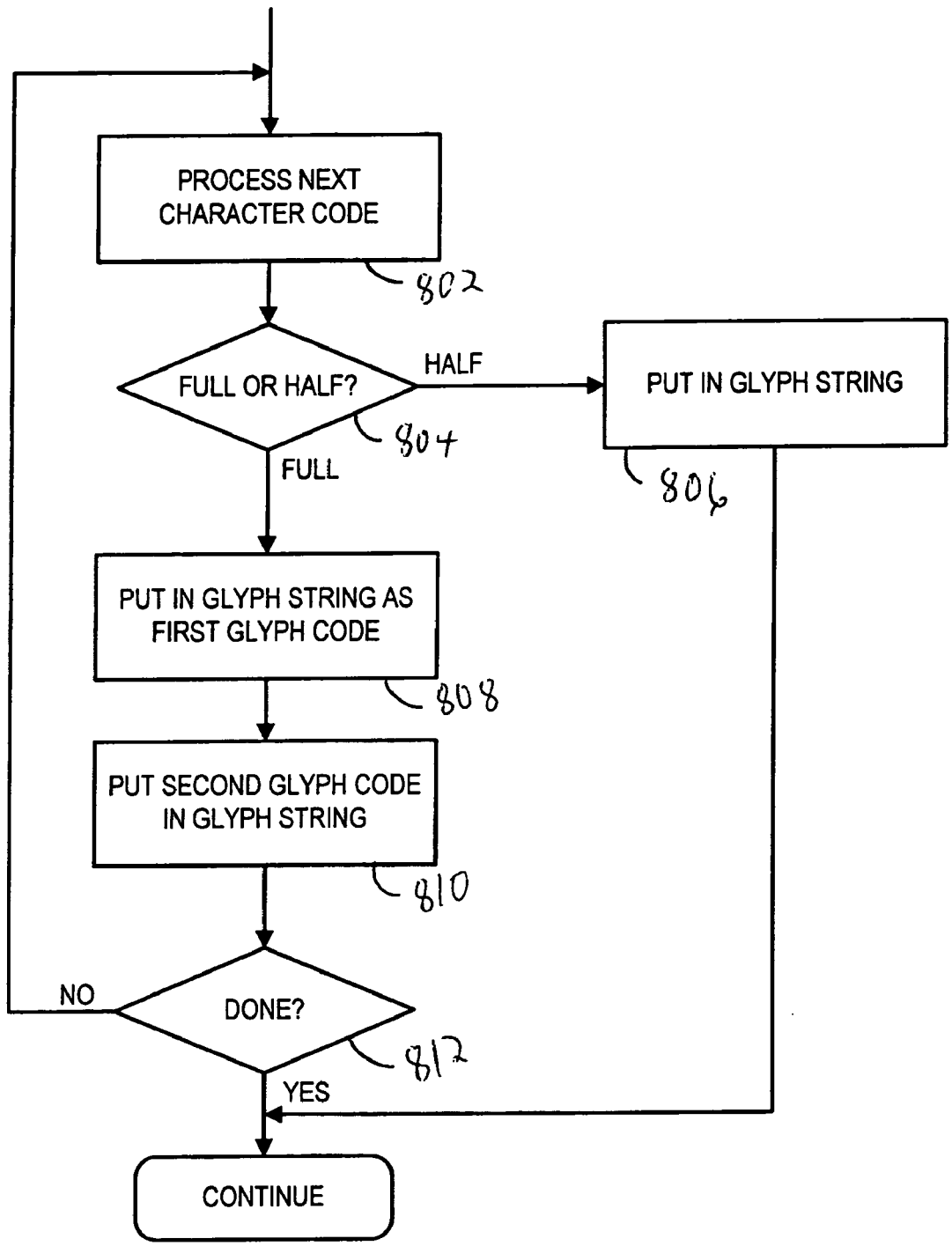
FIG. 8 is a flow chart that shows some details of one step of the method illustrated in FIG. 7.

At 704, the input character code string is transcoded to generate a glyph code string, which may in turn be used to access the glyphs which make up the font shown in FIG. 3. FIG. 8 is a flow chart that illustrates details of step 704.

At 802 in FIG. 8, the next character code in the input character code string is processed. Then, at decision block 804, it is determined whether the next character code represents a full-size character or a half-size character. For example, the determination at block 804 may be made by comparing the character code being processed with a list of half-size character codes. (In the particular example font shown in FIG. 3, the only two half-size characters are the decimal point and the blank space character.) If the character code matches a code on the list, then it represents a half-size character. Otherwise, it represents a full-size character.

If the next character code represents a half-size character, then the code itself may be included in the glyph string (step 806) as representing the sole glyph that makes up the corresponding character. I.e., in this example, a half-size character is completely represented by a single glyph, and the glyph code which represents that glyph is the same as the character code which represents the character.

If the next character code represents a full-size character, then the code itself may be included in the glyph string (step 808) as representing the first, or left-hand, glyph that corresponds to the left half of the corresponding character. Then, at 810, a second, or right-hand, glyph code is included in the glyph string to represent the glyph which corresponds to the right half of the corresponding character.

To give a concrete example of the transcoding of a character code that represents a full-size character, let it be assumed that the next character code is 0012 (hex) and represents the numeral "2". The first glyph code may be the same (i.e., 0012) and may represent the glyph 502 shown in FIG. 5. Moreover, the second glyph code may be FF12 (hex) and may represent the glyph 508 shown in FIG. 5. Thus 0012 in the input character string is transcoded into 0012, FF12 in the glyph string.

To generalize, in one embodiment, every character code may be in the form 00xx (hex). If the character code represents a half-size character, then the single glyph that corresponds to the character is represented by the glyph code 00xx. If the character code represents a full-size character, then the two glyphs that correspond to the character are represented by the glyph codes 00xx, FFxx.

Referring again to FIG. 8, after step 810, it is determined at 812 if there are any more character codes in the input character code string. If not, the process moves on to the next step (706) in FIG. 7. Otherwise, the process loops back to step 802 in FIG. 8.

With the glyph code scheme described above, transcoding from input character code string to glyph code string is performed in a very simple and efficient manner. However, other transcoding methods may be applied. For example, a look-up table may be employed to translate each input character code into one or more glyph codes.

Referring again to FIG. 7, at step 706 (after transcoding of the input character code string to the glyph code string), the glyph code string is used to access, one after the other, the glyph bit maps that represent the glyphs represented by the glyph codes in the glyph code string. The glyph bit maps are used to generate a string bit map that represents the character string represented by the input character code string. Then, at 708, the string bit map is printed as part of the postage indicium. For example, the string bit map generated at 706 may first be incorporated with other bit map elements (e.g., bit maps of invariant portions of the postage indicia) to generate a composite bit map that represents the entire postage indicium. Then the composite bit map may be used to control the print head 612 (FIG. 6) to print the postage indicium pixel by pixel in correspondence to the composite bit map.

Figure 9:
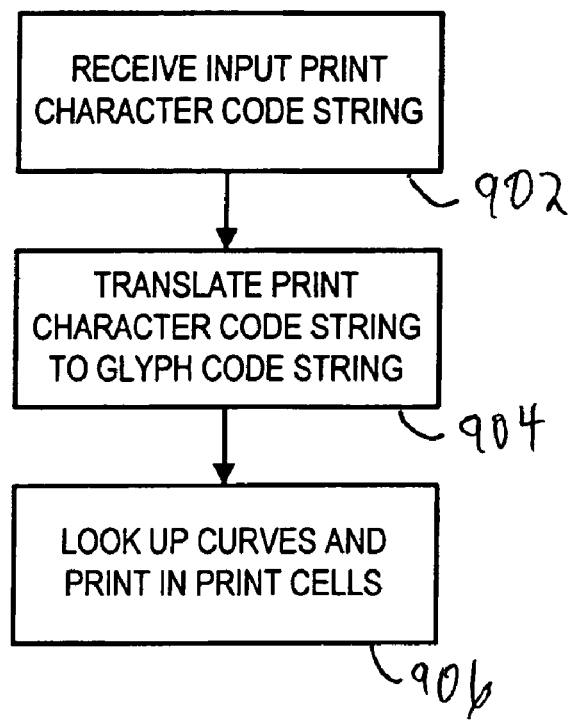
FIG. 9 is a flow chart that illustrates a printing method performed in accordance with another embodiment of the invention.

In the example described above, glyphs are stored in the form of bit maps. However, in alternative embodiments, glyphs may be stored in the form of mathematical expressions that represent the curve(s) that make up the glyphs. FIG. 9 is a flow chart that illustrates a process that may be used in place of the process of FIG. 7 in a case where the glyphs are stored as mathematical expressions.

In the process of FIG. 9, the first two steps, 902 and 904, may be performed in the same manner as the steps 702 and 704 (FIG. 7) as described above. Continuing to refer to FIG. 9, at 906 (after transcoding of the input character code string to the glyph string), the glyph codes may be used one after the other to access the mathematical expressions that define the corresponding glyphs. The mathematical expressions may then be used to generate and print the glyphs in successive print cells. In some embodiments, the mathematical expressions may be used to generate bit maps to be included in the composite bit map as generally described above in connection with step 708.

By representing some characters with one glyph, others with two or more glyphs, and sizing all glyphs to fit the same standard print cell, proportional spacing may be simulated in a software environment that is essentially designed to produce fixed-space printing. In effect, a relatively simple change in font representation and modest software revisions allow for conversion to proportional spacing with improved appearance of the resulting printing and without expensive and time-consuming changes in overall printing software design.

In the particular example shown herein, all characters are represented by either one or two glyphs, but other fonts may be provided in accordance with principles of the present invention such that some characters are represented by three or more glyphs.

Again, in the particular example shown herein, the character set represented in the font includes only fifteen characters. Nevertheless, fonts which include a larger number of characters and/or symbols may be provided in other embodiments. For example, a font which includes at least all ten of the Arabic single-digit numerals and all 26 letters of the Roman alphabet (possibly along with other characters such as the blank space character and one or more punctuation marks, and also, in some embodiments, lower case letters as well) may be provided in other embodiments. Still other embodiments may include one or more characters from alphabets other than the Roman alphabet. It will also be understood that some alternative embodiments may employ fonts having fewer than fifteen characters.

In the particular example shown herein, some characters are divided vertically to produce the constituent glyphs for the characters. In other embodiments, at least some characters may also or alternatively be divided horizontally. By defining at least some characters with glyphs resulting from horizontal splitting of characters, a conversion from fixed vertical line spacing to variable vertical line spacing may be facilitated.

The particular examples described herein are illustrated in the context of a postage meter, but the invention may alternatively be applied in other types of printing devices, including printing by printers driven by personal computers and the like.

The order in which process steps are illustrated and/or described herein should not be deemed to prescribe a fixed order of performing the steps. Rather, the process steps may be performed in any order that is practicable.

The printing process described herein in certain examples calls for transcoding of an input character string to a glyph string, and then using a glyph string to access representations of the constituent glyphs of the desired characters. However, in alternative embodiments, transcoding of the input character code string is not required, and access to the glyph representations may be based on reading the input character code string. For example, a look-up table may be employed to determine what glyph or glyphs to access for each character code in the input character code string.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method of storing and retrieving character image bit maps in a font having alphanumeric characters and punctuation characters, the method comprising:
   for each character of a group of half-size characters consisting of the punctuation characters in the font, storing a respective complete bit map;
   for each character of a group of full-size characters consisting of the alphanumeric characters in the font, storing a respective pair of split bit maps; and
   printing a one of said full-size characters in the font by:
      retrieving a first one of said split bit maps in response to a first glyph code;
      retrieving a second one of said split bit maps in response to a second glyph code that is different from the first glyph code; and
      printing said first and second ones of said split bit maps in a first and a second print cells, respectively, said first and second print cells being adjacent to each other.

2. The method according to claim 1, wherein said group of half-size characters includes a space character and a decimal point character.

3. The method according to claim 2, wherein said group of full-size characters includes a plurality of single-digit numerals.

4. The method according to claim 3, wherein said plurality of single-digit numerals includes ten Arabic numerals.

5. A printing apparatus, comprising:
   a print head; and
   control means, coupled to said print head, for controlling said print head to selectively print half-size characters and full-size characters, both in a font having alphanumeric characters and punctuation characters, wherein the half-size characters consist of the punctuation characters and the full-size characters consist of the alphanumeric characters;
   said control means operative to cause the print head to:
      print each half-size character in the font in a character string in a respective print cell; and
      print each full-size character in the font in the character string in a respective pair of adjacent print cells.

6. The printing apparatus according to claim 5, wherein all of said print cells are equal in size to each other.

7. The printing apparatus according to claim 5, wherein the print head and the control means are included in a postage meter.

8. The printing apparatus according to claim 5, wherein the control means includes:
   means for storing a respective complete bit map for each half-size character; and
   means for storing a respective pair of split bit maps for each full-size character.

9. A printing method, comprising:
   storing data representing only one glyph with respect to each character of a first group of characters in a font, said only one glyph corresponding to said each character;
   storing data representing two or more glyphs with respect to each character of a second group of characters in the font, said two or more glyphs corresponding to said each character of said second group;
   printing a selected character of said first group by printing the only one glyph which corresponds to said selected character of said first group; and
   printing a selected character of said second group by printing the two or more glyphs which correspond to the selected character of said second group, wherein said font comprising alphanumeric characters and punctuation characters, said first group of characters consists of the punctuation characters and said second group of characters consists of said alphanumeric characters.

10. The method according to claim 9, wherein each of said glyphs is represented in the stored data by a respective bit map.

11. The method according to claim 10, wherein each of said bit map is equivalent in size to each other of said bit map.

12. A method of printing a string of characters, the method comprising:
   receiving a sequence of character data codes, each character data code corresponding to a respective character to be printed in said string of characters;
   transcoding said sequence of character data codes to generate a sequence of glyph codes, each glyph code corresponding to a respective glyph, each glyph corresponding to at least part of a respective character, at least some of said glyph each corresponding to less than a complete character;
   using said sequence of glyph codes to generate print image data; and
   printing an image on the basis of the print image data,
   wherein said transcoding step includes:
      causing, with respect to at least one of said character data codes, at least two respective glyph codes to be incorporated in said sequence of glyph codes,
   wherein said transcoding step further includes:
      for each character data code of a first class of character data codes, inserting only two glyph codes in the sequence of glyph codes; and
      for each character data code of a second class of character data codes, inserting only one glyph code in the sequence of glyph codes,
   wherein:
      for each character data code of the second class of character data codes, said inserted one glyph code is identical to said each character code of the second class of character data codes; and
      for each character data code of the first class of character data codes, said inserted two glyph codes consist of:
         (a) a first glyph code that is identical to said each character data code of the first class of character data codes; and
         (b) a second glyph code that is different from said first glyph code, wherein the second glyph code has (a) two least significant hexadecimal digits that are identical to two least significant hexadecimal digits of the first glyph code, and (b) two most significant hexadecimal digits that are different from two most significant hexadecimal digits of the first glyph code.

13. The method according to claim 12, wherein said step of using said sequence of glyph codes to generate print image data includes accessing respective glyph bit maps that correspond to the glyph codes in said sequence of glyph codes.

14. The method according to claim 13, wherein:
   each glyph is sized to fit in a standard print cell, and
   some of said characters occupy only one of said standard print cell and others of said characters occupy two adjoining ones of said standard print cell.

15. The method according to claim 14, wherein the print image data is a postage meter indicium.

16. The method according to claim 14, wherein none of said characters occupies more than two of said standard print cell.

* * * * *